UNITED STATES PATENT OFFICE 2,586,897

DETERGENT COMPOSITION

Willard Howard Woodstock, Crete, Ill., assignor to Victor Chemical Works, a corporation of Illinois No Drawing. Application July 3, 1948,
Serial No. 37,062

14 Claims. (Cl. 252—135)

This invention relates to new detergent compositions.

This application is a continuation-in-part of my copending application Serial No. 613,953, filed August 31, 1945, now abandoned.

The new detergent compositions of this invention may be used as cleansing agents, and tests have proven them to be remarkably effective in washing tests wherein soiled cloth is merely agitated with a water solution of the new detergent.

The detergent composition of this invention comprises the reaction product of a lauryl acid ester of an acid of phosphorus and an olefin oxide, mixed with an alkali metal salt of a molecularly dehydrated phosphoric acid. The reaction products may be suitably prepared by reacting lauryl alcohol and phosphoric anhydride in known proportions and reacting the resulting lauryl acid ester of the phosphorus acid with an olefin oxide, preferably ethylene and propylene oxides. The lauryl ester group is intended to include the mixed or impure alkyl radicals of coconut oil as well as the pure lauryl radical.

The reaction product to be mixed with the alkali metal salt of a molecularly dehydrated phosphoric acid may be made by reacting acid esters of ortho, pyro, and polyphosphoric acids containing at least one lauryl radical and at least one acidic hydrogen atom, with at least three ethylene oxide or two propylene oxide molecules for each acidic hydrogen of the acid ester.

For the purpose of the present invention the lauryl acid ester starting materials need not be pure compounds. For example, a monolauryl acid orthophosphate prepared by reacting two moles of commercial lauryl alcohol with phosphoric anhydride and hydrolyzing the resulting product is entirely satisfactory for the subsequent reaction with an olefin oxide to produce the reaction product used in the new detergents.

The reaction of lauryl alcohol with $P_2O_5$ to produce an acid ester reaction product is not new. The reaction product will have a composition varying with the proportions of alcohol and $P_2O_5$ employed. For example, the following equations illustrate the preparation of typical reaction products:

(a)  $3ROH + P_2O_5 \rightarrow RH_2PO_4 + R_2HPO_4$
(b)  $2ROH + P_2O_5 \rightarrow R_2H_2P_2O_7$
(c)  $5ROH + 3P_2O_5 \rightarrow R_5H_5(P_3O_{10})_2$
(d)  $3ROH + 2P_2O_5 \rightarrow R_3H_3P_4O_{13}$
(e)  $ROH + P_2O_5 \rightarrow RH(PO_3)_2$ The R in the present instance is a lauryl radical. None of these reactions is clear-cut, but generally gives a reaction product which contains a mixture of acid esters, and in most cases a small amount of free phosphoric acid. The reaction products shown in the above examples are the predominant products, but not the sole products. The essential point in the preparation of a reaction product of a lauryl alcohol and $P_2O_5$ is that the resulting ester is an addition product where the number of acidic radicals corresponds to the number of OH groups of the added alcohols, and the primary constituent corresponds to the empirical formula indicated by the equation where the reaction is carried out under anhydrous conditions. Thus, the esters are preferably known as reaction products in view of the fact that the products are mixtures having empirical formulas calculated from the reacting proportions of lauryl alcohol and $P_2O_5$.

Where water is present, the reaction products of alcohols and $P_2O_5$ will hydrolyze to acid orthophosphate esters. For example, when two moles of commercial impure lauryl alcohol are reacted with one mole of phosphoric anhydride and hydrolyzed with water, the essential reaction may be expressed by the following equation:

$$2ROH + P_2O_5 + H_2O \rightarrow 2RH_2PO_4$$

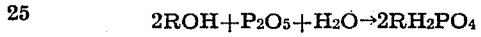

The monolauryl phosphate reaction product is only the predominant material as there are also dilauryl phosphates and free phosphoric acid in proportions to correspond substantially to the empirical formula for the monolauryl phosphate.

It is not essential that the starting material ester reaction products be prepared by the direct reaction of alcohols and phosphoric anhydride. Any suitable means of producing a lauryl acid ester reaction product of a phosphoric acid may be used to obtain the starting material. For example, one mole of lauryl alcohol may be reacted with one mole of $POCl_3$ and subsequently reacted with one mole of ethyl alcohol to give an intermediate comprising essentially a lauryl ethyl chlorophosphate. This may be hydrolyzed to give lauryl ethyl acid orthophosphate starting material. The reaction product, however, is not pure lauryl ethyl acid orthophosphate as has been pointed out above. A more suitable procedure, however, would be to react one mole of lauryl alcohol with one mole of ethyl metaphosphate according to the equation:

$$ROH + R'PO_3 \rightarrow RR'HPO_4$$

The starting esters are preferably lauryl acid esters of ortho, pyro, or polyphosphoric acids where lauryl and acidic hydrogen radicals are present in equal numbers. This, however, is not absolutely necessary.

The reaction products of lauryl acid esters of phosphorus acids with olefine oxides when mixed with the alkali metal salts of molecularly dehydrated phosphoric acid esters yield excellent detergent compositions for washing fabrics and the like. Some of the reaction products which were prepared and tested satisfactorily in detergent compositions are as follows:

R. P. 1—Lauryl ethyl acid orthophosphate reacted with 3 moles ethylene oxide.
R. P. 2—Trilauryl acid tetraphosphate reacted with 12 moles ethylene oxide.
R. P. 3—Monolauryl acid orthophosphate reacted with 6 moles ethylene oxide.
R. P. 4—Lauryl methyl acid orthophosphate reacted with 3 moles ethylene oxide.
R. P. 5—Dilauryl acid pyrophosphate reacted with 7 moles ethylene oxide.
R. P. 6—Dilauryl acid pyrophosphate reacted with 5 moles propylene oxide.
R. P. 7—Trilauryl acid tetraphosphate reacted with 9 moles propylene oxide.
R. P. 8—Monolauryl acid orthophosphate reacted with 4 moles propylene oxide.

As has been pointed out above, the starting phosphate ester in each case is an impure product having an empirical formula corresponding to the ester named. It appears, however, that the predominant amount of each reaction product is the named ester. In general, it has been found that any of the esters of an acid of phosphorus which contains at least one lauryl radical and at least one acidic hydrogen will react with olefin oxides, particularly ethylene and propylene oxides, to give compounds which are suitable for use in the detergent compositions of this invention. The acids which are suitable are orthophosphoric, pyrophosphoric and intermediate polyphosphoric acids or mixtures.

The reaction products listed above which are used to prepare the detergent compositions of the present invention may be prepared, for example, as follows:

Reaction Product No. 1 may be prepared by slowly adding one mole of lauryl alcohol to one mole of ethyl metaphosphate under anhydrous conditions while maintaining the reaction temperature at not over 30° C. After the exothermic reaction has ceased, the liquid ester product is treated with ethylene oxide at about 60° C. until no further absorption of the ethylene oxide is noted. The excess ethylene oxide is evaporated off leaving a viscous liquid reaction product the analysis of which indicates that three moles of ethylene oxide have been absorbed by one mole of lauryl ethyl acid orthophosphate.

Reaction Product No. 2 may be prepared by placing three moles of lauryl alcohol in a reaction vessel and slowly adding two moles of phosphoric anhydride with agitation while maintaining a temperature of about 40° C. The mixture is agitated for several hours after all of the phosphoric anhydride is dissolved. The product is a clear, brownish colored liquid having the empirical formula:

$$(C_{12}H_{25})_3H_3P_4O_{13}$$

Ethylene oxide is then added in excess to this liquid ester product while maintaining the temperature at not over 60° C. The excess ethylene oxide is evaporated off leaving a reaction product corresponding to one mole of trilauryl acid tetraphosphate and 12 moles of ethylene oxide.

Reaction Product No. 3 may be prepared by reacting a monolauryl acid orthophosphate reaction product with an excess of ethylene oxide at a temperature of about 60° C. After the reaction is completed, the excess ethylene oxide is evaporated off leaving a viscous product. This reaction product is dispersible in water and gives a neutral reaction.

Reaction Product No. 3 may also be prepared by reacting one mole of lauryl alcohol with one mole of metaphosphoric acid under anhydrous conditions at a temperature of about 30° C. The resulting liquid ester product is then reacted with an excess of ethylene oxide at about 60° C. The excess ethylene oxide is evaporated off leaving a reaction product corresponding to one mole of monolauryl orthophosphate and six moles of ethylene oxide.

Reaction Product No. 4 may be prepared in accordance with the procedure for Reaction Product No. 1 except that methyl metaphosphate is substituted for the ethyl metaphosphate.

Reaction Product No. 5 may be prepared by adding, under anhydrous conditions, one mole of phosphoric anhydride to two moles of lauryl alcohol with agitation while maintaining a reaction temperature of about 40° C. Agitation is continued until all of the phosphoric anhydride is dissolved and a homogeneous liquid dilauryl acid pyrophosphate product obtained. Ethylene oxide in vapor form is bubbled through the liquid product at about 60° C. until an excess of ethylene oxide is present. The excess ethylene oxide is evaporated off leaving a paste-like reaction product corresponding to one mole of dilauryl acid pyrophosphate plus seven moles of ethylene oxide.

Reaction Product No. 6 may be prepared in the same manner as No. 5 except that isopropylene oxide is added to the dilauryl acid pyrophosphate. In this case, however, only five moles of propylene oxide will be absorbed giving a reaction product having the empirical formula:

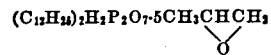

Reaction Product No. 7 may be prepared by the procedure employed for Reaction Product No. 2 except that isopropylene oxide is substituted for the ethylene oxide. In this case, only 9 moles of propylene oxide will react giving a reaction product having the empirical formula:

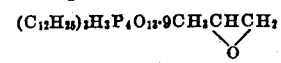

Reaction Product No. 8 may be prepared in the same manner as No. 3 by substituting isopropylene oxide for the ethylene oxide. The reaction product has the empirical formula:

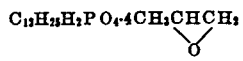

The olefin oxides that are used are preferably the ethylene and isopropylene oxides, while the phosphorus acids are preferably either the ortho, pyro or polyphosphoric acids. In reacting the starting lauryl acid ester reaction products of these acids, it has been found that three moles of ethylene oxide or two moles of isopropylene oxide will add to each acidic hydrogen atom and in the case of acids containing

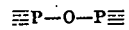

groups, one mole of either olefin oxide will add to the connecting oxygen atom between the phosphorus atoms.

The inorganic phosphates which I have found to be suitable in my detergent include the alkali metal salts of the molecularly dehydrated phosphoric acids. These may be exemplified as follows: sodium hexametaphosphate, tetrasodium pyrophosphate, pentasodium tripolyphosphate, and the sodium salts of the intermediate polyphosphoric acids or mixtures of the above salts.

The detergent compositions may be suitably prepared by mixing the liquid or paste-like reaction products of the lauryl acid ester reaction products of phosphorus acids and olefin oxides with dry powdered or granular alkali metal salts of the molecularly dehydrated phosphoric acids, preferably in proportions ranging from 1 to 75 parts of the organic reaction product to 99 to 25 parts of the inorganic salt to give 100 parts of a substantially dry mixture.

In order to prove the value of these new detergent compositions washing tests were made of a standardized soiled cloth under controlled conditions. The degrees of soil removal was determined by comparing the values of light reflection from the washed cloth by means of a Photovolt Reflection Meter.

A typical soiled cloth was prepared by immersing a white wool flannel in a soiling solution composed of 7.5 grams olive oil, 7.5 grams tallow, 15 grams mineral oil, and 10 grams oildag, dissolved in 2 liters of carbon tetrachloride. the cloth was wrung to remove excess of the soiling solution and allowed to stand until the solvent had evaporated. The water employed in making the tests was Chicago Heights city water diluted with distilled water to give a hardness of 150 parts per million. The detergent compositions were employed in 1% concentration.

The washing was conducted by placing small swatches of the soiled cloth in the jars of a Launder-Ometer laboratory washing machine. The temperature of the solution was held at 120° F. and the machine run for thirty minutes. The cloth was then rinsed with distilled water and dried. The degree of soil removal was determined as the percentage ratio of light reflectance to the difference in light reflectance between the completely soiled cloth and the unsoiled cloth.

Numerous mixtures of the organic reaction products and the various builder salts were made up and washing tests were conducted in the manner described. The following table shows typical results expressed as the percentage total soil removal.

| Composition | | Proportion of reaction product to builder | | | | | |
|---|---|---|---|---|---|---|---|
| Reaction Product | Builder | 0 / 100 | 25 / 75 | 50 / 50 | 75 / 25 | 100 / 0 | |
| | | Percent total soil removal | | | | | |
| R. P. No. 1 | (NaPO$_3$)$_6$ | 35 | 92 | 83 | 69 | | |
| | Na$_5$P$_3$O$_{10}$ | 45 | 87 | 76 | 72 | | 5 |
| | Na$_4$P$_2$O$_7$ | 40 | 90 | 78 | 79 | | |
| R. P. No. 2 | (NaPO$_3$)$_6$ | 35 | 89 | 87 | 74 | | |
| | Na$_5$P$_3$O$_{10}$ | 45 | 97 | 95 | 76 | | 0 |
| | Na$_4$P$_2$O$_7$ | 40 | 80 | 93 | 86 | | |
| R. P. No. 3 | (NaPO$_3$)$_6$ | 35 | 89 | 92 | 89 | | |
| | Na$_5$P$_3$O$_{10}$ | 45 | 82 | 94 | 82 | | 65 |
| | Na$_4$P$_2$O$_7$ | 40 | 79 | 95 | 93 | | |
| R. P. No. 4 | (NaPO$_3$)$_6$ | 35 | 93 | 99 | 92 | | |
| | Na$_5$P$_3$O$_{10}$ | 45 | 95 | 94 | 94 | | 5 |
| | Na$_4$P$_2$O$_7$ | 40 | 97 | 96 | 95 | | |
| R. P. No. 5 | (NaPO$_3$)$_6$ | 35 | 77 | 92 | 93 | | |
| | Na$_5$P$_3$O$_{10}$ | 45 | 90 | 99 | 95 | | 5 |
| | Na$_4$P$_2$O$_7$ | 40 | 97 | 89 | 62 | | |
| R. P. No. 6 | (NaPO$_3$)$_6$ | 35 | 89 | 94 | 71 | | |
| | Na$_5$P$_3$O$_{10}$ | 45 | 99 | 92 | 91 | | 5 |
| | Na$_4$P$_2$O$_7$ | 40 | 95 | 93 | 95 | | |
| R. P. No. 7 | (NaPO$_3$)$_6$ | 35 | 85 | 86 | 78 | | |
| | Na$_5$P$_3$O$_{10}$ | 45 | 99 | 95 | 84 | | 0 |
| | Na$_4$P$_2$O$_7$ | 40 | 99 | 100 | 94 | | |
| R. P. No. 8 | (NaPO$_3$)$_6$ | 35 | 100 | 100 | 99 | | |
| | Na$_5$P$_3$O$_{10}$ | 45 | 96 | 100 | 88 | | 17 |
| | Na$_4$P$_2$O$_7$ | 40 | 90 | 98 | 93 | | |

As was pointed out above, the percentage of total soil removal was measured by the degree of whiteness or the percentage of light reflectance between the completely soiled and the unsoiled cloth. For example, R. P. No. 6 and (NaPo$_3$)$_6$ with the reflectometer set at 0 for the completely soiled cloth and at 100 for the unsoiled cloth, the percent of light reflected from the cloth washed wtih (NaPO$_3$)$_6$ alone was 35%. With the reaction product alone the percent of light reflected was 5%. With a mixture of 25% reaction product and 75% (NaPO$_3$)$_6$ the light reflected was 89%. Other values were determined in the same manner.

The reaction products are more expensive than the inorganic detergent salts and their use in the detergent compositions is most advantageous from an economical view where relatively small amounts of reaction products may be used with large amounts of the inorganic salts. When used in these proportions, the resulting detergents are very effective as illustrated in the following table:

| Composition | | Proportion of reaction product to builder | | | | |
|---|---|---|---|---|---|---|
| Reaction Product | Builder | 0 / 100 | 2 / 98 | 4 / 96 | 6 / 94 | 8 / 92 |
| | | Per Cent Total Soil Removal | | | | |
| R. P. No. 3 | Na$_4$P$_2$O$_7$ | 40 | 63 | 83 | 76 | 89 |
| | (NaPO$_3$)$_6$ | 35 | 48 | 70 | 67 | 70 |
| | Na$_5$P$_3$O$_{10}$ | 45 | 61 | 70 | 75 | 76 |
| R. P. No. 4 | (NaPO$_3$)$_6$ | 35 | 62 | 60 | 58 | 46 |
| | Na$_5$P$_3$O$_{10}$ | 45 | 90 | 79 | 68 | 57 |
| | Na$_4$P$_2$O$_7$ | 40 | 70 | 68 | 57 | 48 |
| R. P. No. 6 | Na$_4$P$_2$O$_7$ | 40 | 51 | 74 | 81 | 91 |
| R. P. No. 7 | Na$_5$P$_3$O$_{10}$ | 45 | 83 | 62 | 68 | 53 |
| | Na$_4$P$_2$O$_7$ | 40 | 73 | 84 | 67 | 50 |
| | Na$_4$P$_2$O$_7$ | 40 | 75 | 92 | 98 | 100 |
| R. P. No. 8 | (NaPO$_3$)$_6$ | 35 | 67 | 91 | 82 | 86 |
| | Na$_5$P$_3$O$_{10}$ | 45 | 79 | 86 | 87 | 88 |

The above tests show that compositions containing as little as 2% of the reaction products and 98% of the molecularly dehydrated phosphate salts give increased soil removal. Good results have been obtained with the detergent compositions in washing wool, cotton and other fabrics as well as for washing dishes, cleaning metal and the like.

Tests were made on several types of commercial wetting agents to show their effect on the detergent power of builder salts. In these tests 1% concentrations were used and water contained 150 parts per million of hardness at a temperature of 120° F. The standard soiled fabric was washed in each test for thirty minutes and the percentage of soil removal determined by percentage of light reflectance as measured. These tests proved that the commercial wetting agents were not near so effective when used in washing compositions even when they are combined with the builder salts described and claimed herein. Some of the results that were obtained with these commercial wetting agents were as follows:

| Commercial Agent | Builder | 0 / 100 | 2 / 98 | 4 / 96 | 6 / 94 | 8 / 92 | 100 / 0 |
|---|---|---|---|---|---|---|---|
| | | Per cent whiteness (total per cent reflectance) | | | | | |
| (A) Sodium Alkyl aryl sulfonate. | Na$_4$P$_2$O$_7$ | 40 | 40 | 40 | 40 | 40 | 65 |
| (B) Sodium Lauryl Sulphate. | Na$_4$P$_2$O$_7$ | 40 | 41 | 43 | 43 | 45 | 11 |
| (C) Sodium salt of alkylated aryl sulfonate. | Na$_4$P$_2$O$_7$ | 40 | 42 | 44 | 44 | 42 | 15 |
| (D) Sodium salt of fatty acid monoglyceride sulfate. | Na$_4$P$_2$O$_7$ | 40 | 44 | 44 | 44 | 42 | 75 |

It has been proposed to make detergents by combining a soluble polyglycerol partial ester containing at least one unesterified hydroxyl group with an inorganic sulfate and a minor proportion of a soluble alkali metaphosphate or an alkali pyrophosphate. Such a composition is described in Australian Patent 24,110, dated August 24, 1935. These compositions, however, are intended to make a powdery detergent from the oily or syrupy polyglycerol ester. Such combinations do not produce detergents having the superior qualities of the detergent compositions described and claimed herein.

Having described my invention in considerable detail together with typical examples of the same, it is my intention that the invention be not limited by any of the details of description unless otherwise specified but rather be construed broadly within its spirit and scope as set out in the accompanying claims.

I claim:

1. A detergent composition comprising 1 to 75 parts by weight of the neutral organic ester reaction product of a lauryl acid ester of a phosphorus acid selected from the group consisting of ortho, pyro, and polyphosphoric acids containing at least one acidic hydrogen atom and an olefin oxide selected from the group consisting of ethylene oxide and propylene oxides in the proportions of at least three moles of ethylene oxide and two moles of a propylene oxide for each acidic hydrogen atom, mixed with 99 to 25 parts of an alkali metal salt of a molecularly dehydrated phosphoric acid.

2. A detergent composition as set out in claim 1 wherein the phosphorus acid of the reaction product is orthophosphoric acid.

3. A detergent composition as set out in claim 1 wherein the phosphorus acid of the reaction product is pyrophosphoric acid.

4. A detergent composition as set out in claim 1 wherein the phosphorus acid of the reaction product is a polyphosphoric acid.

5. A detergent composition as set out in claim 1 wherein the olefin oxide is ethylene oxide.

6. A detergent composition as set out in claim 1 wherein the olefin oxide is propylene oxide.

7. A detergent composition as set out in claim 1 wherein the alkali metal salt is tetrasodium pyrophosphate.

8. A detergent composition as set out in claim 1 wherein the alkali metal salt is sodium hexametaphosphate.

9. A detergent composition as set out in claim 1 wherein the alkali metal salt is pentasodium tripolyphosphate.

10. A detergent composition comprising the neutral organic ester reaction product of a lauryl acid ester of a phosphorus acid selected from the group consisting of ortho, pyro, and polyphosphoric acids containing at least one acidic hydrogen atom and at least three molecules of ethylene oxide per acidic hydrogen atom, mixed with an alkali metal salt of a molecularly dehydrated phosphoric acid, the proportions by weight of reaction product to alkali metal salt being between 1 to 99 and 75 to 25.

11. A detergent composition comprising the neutral organic ester reaction product of a lauryl acid ester of a phosphorus acid selected from the group consisting of ortho, pyro, and polyphosphoric acids containing at least one acidic hydrogen atom and at least two molecules of propylene oxide per acidic hydrogen atom, mixed with an alkali metal salt of a molecularly dehydrated phosphoric acid, the proportions by weight of reaction product to alkali metal salt being between 1 to 99 and 75 to 25.

12. A detergent composition comprising 1 to 75 parts by weight of the neutral organic ester reaction product of monolauryl acid orthophosphate and ethylene oxide mixed with 99 to 25 parts of pentasodium tripolyphosphate.

13. A detergent composition comprising 1 to 75 parts by weight of the neutral organic ester reaction product of monolauryl acid orthophosphate and propylene oxide mixed with 99 to 25 parts of pentasodium tripolyphosphate.

14. A detergent composition comprising 1 to 75 parts by weight of the neutral organic ester reaction product of a lauryl acid ester of a polyphosphoric acid and propylene oxide mixed with 99 to 25 parts of sodium tripolyphosphate.

WILLARD HOWARD WOODSTOCK.

REFERENCES CITED

The following references are of record in the file of this patent:

UNITED STATES PATENTS

| Number | Name | Date |
|---|---|---|
| 2,372,244 | Adams et al. | Mar. 27, 1945 |
| 2,396,278 | Lind | Mar. 12, 1946 |

FOREIGN PATENTS

| Number | Country | Date |
|---|---|---|
| 452,508 | Great Britain | Aug. 24, 1936 |